May 9, 1950     F. G. TABORSKY     2,507,324
APPARATUS FOR MEASURING ELECTRICAL CHARACTERISTICS
Filed May 4, 1946
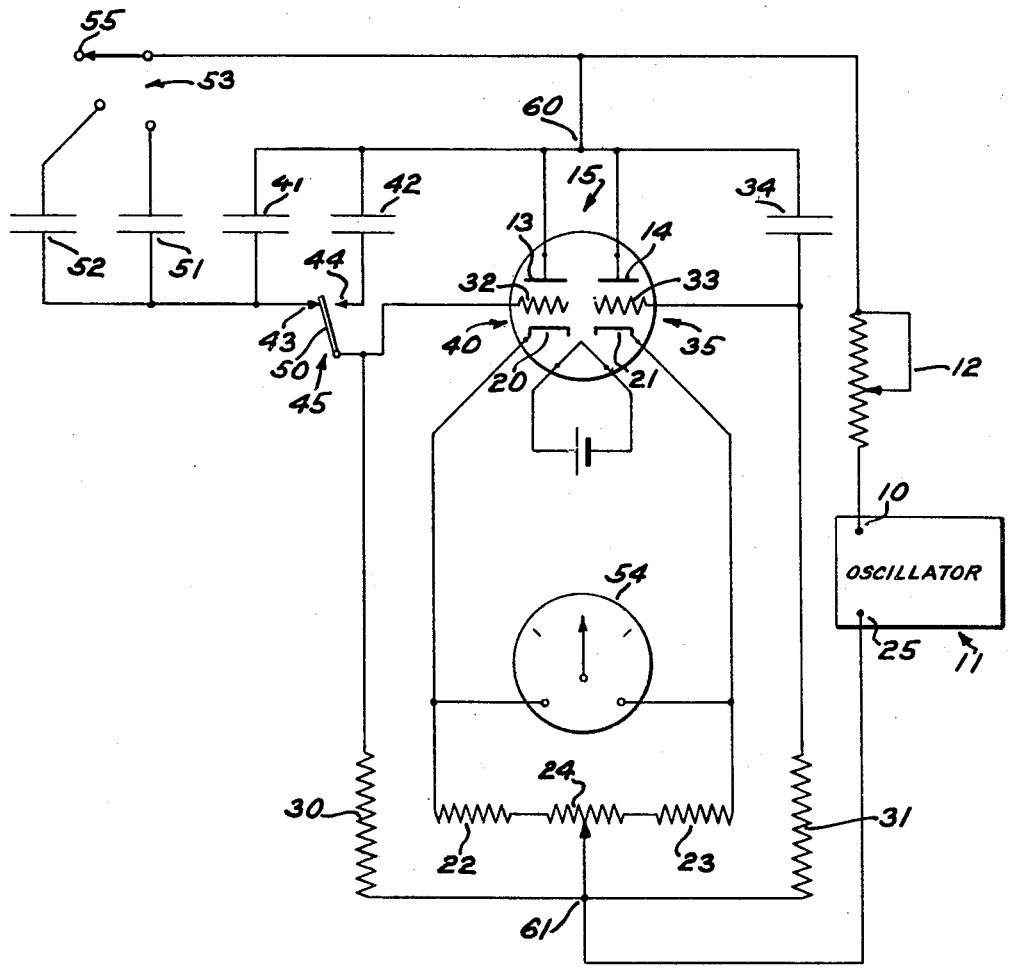
INVENTOR
F. G. TABORSKY
BY O. F. Kane
ATTORNEY Patented May 9, 1950

2,507,324

UNITED STATES PATENT OFFICE 2,507,324

APPARATUS FOR MEASURING ELECTRICAL CHARACTERISTICS

Frank G. Taborsky, Maywood, Ill., assignor to Western Electric Company, Incorporated, New York, N. Y., a corporation of New York Application May 4, 1946, Serial No. 667,295

9 Claims. (Cl. 175—183)

This invention relates to apparatus for measuring electrical characteristics.

In the manufacture of condensers on a production basis where many units of one capacitance value are made, it is desirable to test the condensers for capacity at a rate of speed commensurate with the rate of production.

An object of this invention is to provide new and efficient apparatus for determining the electrical characteristics of electrical apparatus.

In accordance with one embodiment of the invention a twin triode thermionic tube is utilized to compare a condenser under test with a standard of known capacity by connecting a differential microammeter to the two cathodes of the tube and connecting the standard condenser between the grid and plate of one triode section while the condenser under test is connected between the grid and plate of the other triode section, whereupon the application of alternating current from a suitable source to both sections of the tube will cause the differential meter to indicate the comparative capacity of the condenser under test with respect to the standard. If the two condensers are equal in value the rectified current through each triode section is equal and the differential meter will indicate zero. If the standard condenser is larger in value than the condenser under test, the grid connected to the standard condenser will assume a more positive charge, increasing the rectification in this section of the tube and the meter will indicate an increased cathode current in this direction.

A complete understanding of this invention may be had by reference to the accompanying drawing wherein the single figure comprises a circuit diagram illustrative of the invention.

As shown in the drawing, one output terminal 10 of an oscillator 11 is connected through a variable resistor 12 to the plates 13 and 14 of a twin triode thermionic tube 15. The cathodes 20 and 21 of the tube 15 are connected through fixed resistors 22 and 23, respectively, and portions of a variable resistor 24 to the second output terminal 25 of the oscillator 11. Resistors 30 and 31 are connected between the output terminal 25 of the oscillator 11 and the grids 32 and 33, respectively, of the tube 15.

A standard condenser 34 of known capacity is connected between the plate 14 and the grid 33 of one triode section 35 of the tube 15. The plate 13 of the other triode section 40 of the tube 15 is connected to one side of a condenser 41 having less capacity than the standard condenser 34 and to one side of a condenser 42 to be tested, the other terminals of the condensers 41 and 42 are connected to contacts 43 and 44, respectively, of a switch 45 which is operable to selectively connect either of the condensers to the grid 32 by means of a contact arm 50 of the switch 45. Contact 43 of the switch 45 is also connected to one side of condensers 51 and 52 which may be selectively connected in parallel with condenser 41 by means of a switch 53. A current indicating device such as microammeter 54 is connected between the cathodes 20 and 21 to respond to and indicate cathode current differentials between the two triode sections 35 and 40.

The capacities of condensers 34, 41 and 52 are chosen in accordance with the capacity range within which the condensers under test must fall to be acceptable. The capacity of the condenser 34 should be the same as the desired capacity for which the condensers are to be tested. Condenser 41 should have capacity equal to the lowest acceptable for the condenser under test. The capacity of condenser 52 should be such that when added to the capacity of condenser 41 it will provide a combined capacity equal to the desired capacity of the condenser under test and condenser 51 should have a capacity which when added to the condenser 41 will provide a capacity equal to the highest acceptable capacity for the condenser under test. If, for example, it is desired to test condensers which must have a capacity of 1000 micromicrofarads within ±10%, the condenser 34 should have a capacitance of 1000 micromicrofarads, the condenser 41 should have a capacity of 900 micromicrofarads, and the capacity values of condensers 51 and 52 should be 200 micromicrofarads and 100 micromicrofarads, respectively.

To calibrate the apparatus for testing condensers in order to determine whether or not they have a capacity of 1000 micromicrofarads ±10%, the switch 45 is operated to close the circuit between the arm 45 and the contact 43 thereby connecting the condenser 41 between the plate 13 and the grid 32. Then the switch 53 is operated to connect condenser 52 in parallel with condenser 41, thus providing a total external capacity of 1000 micromicrofarads between the plate 13 and the grid 32 of the triode section 40. The external capacity between the grid and plate of the triode section 40 will then be equal to the external capacity between the plate and grid of the triode section 35. A suitable alternating voltage provided by the oscillator 11 is impressed at the points 60 and 61 of the circuit. If all the elements of the circuit are perfectly matched and if the arm of the variable resistor 24 is in the center of the resistance, the circuit should be symmetrical and the cathode currents in both triode sections should be equal. Under such conditions the potential difference between the two cathodes will be zero and the meter 54 should so indicate. In case there is an unbalance in the circuit, the variable resistor 24 may be adjusted until the meter registers zero.

The switch 53 is then operated to connect condenser 51 in parallel with condenser 41 to effect a total capacity of 1100 micromicrofarads shunted across the plate 13 and the grid 32 of the triode section 40. It will be apparent that the external capacity connected between the grid and plate of the triode section 40 is 10% higher than the capacity connected between the plate and the grid of the triode section 35. In the otherwise symmetrical circuit the cathode current in the triode section 40 will be higher than the cathode current in the triode section 35 because of the reduced impedance due to the greater capacity between the plate and the grid of the triode section 40. There will then be a potential difference between the two cathodes which will be reflected by a swing of the pointer of the meter 54 in one direction, for example, to the right. A convenient point on the right side of the scale may be arbitrarily selected and indexed as either +10% or 1100 micromicrofarads. The extent of the deflection of the meter pointer may be adjusted to coincide with the indexed point by selecting the voltage impressed across the circuit points 60 and 61, which may be done by varying the resistance 12. This resistance is effectively a deflection limiting adjustment for the meter 54.

The switch 53 is then operated to the open circuit position 55 in which position there is shunted across the plate 13 and the grid 32 of the triode section 40 only the condenser 41 having a capacity of 900 micromicrofarads or 10% lower than the desired capacity of 1000 micromicrofarads. Obviously, the impedance between the plate 13 and the grid 32 will be increased because of the decrease in capacity, and the current through the triode section 40 will be less than that through the triode section 35 thereby creating a potential difference between the cathodes which will be reflected in a swing of the meter pointer to the left side of the scale. The meter scale at this point may be marked as either −10% or 900 micromicrofarads. Zero on the meter obviously indicates 1000 micromicrofarads.

To determine whether or not a condenser to be tested falls between 900 and 1100 micromicrofarads it is connected between the contact 44 and the plate 13 of the triode section 40 after which the switch 45 is operated to open the circuit between the contact 43 and the arm 50 and to close the circuit between the contact 44 and the arm 50 thereby disconnecting the condensers 41, 51 and 52 from the grid 32 and connecting the condenser 42 to the grid 32. If the oscillator voltage applied at the circuit points 60 and 61 is the same as the calibrating voltage, the meter 54 will accurately and quickly indicate whether or not the condenser 42 measures 1000 micromicrofarads or is within the acceptable limits of ±10%. A deflection beyond the ±10% markings on the scale would indicate that the condenser was unacceptable.

It is believed that the resistor 31 together with the condenser 34 form a voltage divider, and the connection to the grid 33 is a tap along the voltage divider. The other side of the circuit is similar in that the resistor 30 together with the condenser or condensers which may be in the circuit with it form a voltage divider which is tapped to provide the connection to the grid 32. A change in the capacity of the condenser combination between the resistor 30 and the plate 13 obviously will change the total impedance between the plate 13 and the point 61 thereby changing the voltage drop across the resistor 30 which in turn changes the potential on the grid 32 in either direction depending upon whether the capacity of the condenser combination between the resistor 30 and the plate 13 was increased or decreased.

The specific embodiment disclosed herein contemplates the use of two triode sections in one envelope, however, the same results can be achieved by using separately enveloped triodes having substantially the same characteristics.

What is claimed is:

1. An apparatus for determining an electrical impedance characteristic of an electrical device comprising a pair of electronic tubes each having an anode, a cathode and a grid, a source of alternating current, means for applying said alternating current between the anode and cathode of one of said tubes, means for applying said alternating current between the anode and cathode of the other of said tubes, means for applying a potential from said source between the cathode and grid of one of said tubes, means for applying an equal potential from said source between the cathode and grid of the other of said tubes, a standard electrical device connected between the anode and grid of one of said tubes to modify the grid potential thereof and vary the effective impedance of the tube, means for connecting an electrical device whose electrical impedance is to be determined between the anode and grid of the other tube to modify its grid potential and vary its effective impedance, and means responsive to the differential impedance of said tubes to indicate the impedance characteristic of the electrical device whose electrical impedance is being determined.

2. An apparatus for measuring electrical impedance characteristics comprising a pair of electronic tubes each having an anode, a grid and a cathode, a source of alternating current having one side connected to said anodes and the other side connected to said cathodes, means for applying a potential on the grid of one of said tubes including a standard impedance element connected between the anode and the grid of said one tube and a resistive element connected between the grid and the cathode of said one tube, a resistive element connected between the grid and the cathode of the second tube, means for connecting a device to be tested between the anode and the grid of said second tube, and means responsive to current flow in the anode-cathode circuits of said tubes to indicate the current differential in said anode-cathode circuits as an indication of said impedance characteristics.

3. An apparatus for determining an electrical impedance characteristic of a device relative to a standard comprising a pair of triode tube sections each having a grid, a plate and a cathode, a cathode resistor connected to each cathode, a source of alternating current having one side connected to said plates and the other side connected to said cathodes of both sections through said cathode resistors, a resistor coupled between each of said grids and said other side of the source of alternating current, means for connecting the standard between the grid and the plate of one tube section, means for connecting the device under test between the grid and the plate of the other tube section, and indicating means connected between said cathodes, said indicating means being responsive to a difference in magnitude of the cathode currents in the tube sections.

4. An apparatus for determining an electrical impedance characteristic of a device relative to a standard comprising a pair of triode tube sections each having a grid, a plate and a cathode, a resistor connected between said cathodes, a source of current having one side connected to said plates of both tube sections and the other side connected to said resistor at a selected point between its ends, a resistor coupled between each of said grids and said other side of the source of current, means for connecting the standard between the grid and the plate of one tube section, means for connecting the device under test between the grid and the plate of the other tube section, and indicating means connected across said cathodes, said indicating means being responsive to differential cathode currents.

5. An apparatus for measuring electrical impedance characteristics comprising an electronic tube section having an anode, a grid and a cathode, a cathode resistor having one end connected to said cathode, means for applying an alternating voltage to the anode-cathode circuit of said tube section including a voltage divider having a standard impedance element connected between the anode and the grid of said tube section and a second impedance element connected between said grid and the other end of said cathode resistor, means for substituting an article to be tested in place of said standard element, a second electronic tube section similar to said first electronic tube section, a cathode resistor connected to the cathode of the second tube section, means for applying an alternating voltage to the anode-cathode circuit of said second tube section, means coupled to said cathode resistors for electrically balancing said anode-cathode circuits, and means responsive to cathode currents connected between said cathodes to indicate the balance or the degree of unbalance of said circuits as an indication of the electrical characteristics of said article.

6. A device for measuring electrical impedance characteristics of articles comprising means for connecting an article to be tested between the anode and the grid of an electronic tube section, means for applying an alternating current between the cathode and the anode of said tube section to cause current to flow in said tube section, means for applying an alternating current between the anode and the cathode of a second electronic tube section to cause current to flow therethrough, and means for determining the extent of the difference between the cathode currents of said tubes as an indication of the electrical characteristics of said article.

7. Means for determining the capacity of a condenser comprising means for connecting said condenser between a grid and an anode in a triode electronic tube section, means for connecting a condenser having a known capacity between an anode and a grid in a second triode electronic tube section having substantially the same characteristics as the first said tube section, means for applying an alternating voltage across the anodes and cathodes of both tube sections to cause current to flow through both tube sections, and means for determining the difference in magnitude of the current flow in the tube sections as an indication of the capacity of the condenser being tested.

8. Means for determining electrical reactive properties including means for developing with alternating current a stream of electrons, means for developing with alternating current a second stream of electrons from an emission point to a second point, means for connecting a device to be tested between said second point and a third point intercepting the second stream of electrons to apply at said intercepting point a modifying potential, thereby to change the magnitude of the second stream of electrons, and means for determining the difference between the magnitudes of said streams of electrons as a measure of the reactive properties of said device.

9. Means for determining the capacity of a condenser comprising means for developing a stream of electrons, means for developing with alternating current a second stream of electrons between an emission point and a second point, means for connecting a condenser to be tested between said second point and a point intercepting said second stream of electrons to apply a modifying potential at said intercepting point, thereby to change the magnitude of the second stream of electrons in proportion to the capacity of the condenser, and means for determining the difference between the magnitudes of the two streams of electrons as an indication of the capacity of said condenser.

FRANK G. TABORSKY.

REFERENCES CITED

The following references are of record in the file of this patent:

UNITED STATES PATENTS

| Number | Name | Date |
|---|---|---|
| 1,727,388 | Affel | Sept. 10, 1929 |
| 2,086,965 | Shepard, Jr. | July 13, 1937 |
| 2,296,867 | Osborne | Sept. 29, 1942 |
| 2,392,396 | Likel | Jan. 8, 1946 |

FOREIGN PATENTS

| Number | Country | Date |
|---|---|---|
| 663,437 | France | Apr. 8, 1929 |
| 436,923 | Great Britain | Oct. 27, 1934 |